US 7,831,381 B2

(12) United States Patent
Thota

(10) Patent No.: US 7,831,381 B2
(45) Date of Patent: Nov. 9, 2010

(54) DATA ENGINE FOR RANKING POPULARITY OF LANDMARKS IN A GEOGRAPHICAL AREA

(75) Inventor: Chandrasekhar Thota, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/197,457

(22) Filed: Aug. 4, 2005

(65) Prior Publication Data

US 2007/0032942 A1 Feb. 8, 2007

(51) Int. Cl.
*G01C 21/00* (2006.01)
(52) U.S. Cl. .................. 701/208; 701/200; 340/995.24
(58) Field of Classification Search ................ 701/200, 701/208–210, 206, 207, 211; 340/995.13, 340/995.14, 995.24
See application file for complete search history.

(56) References Cited

U.S. PATENT DOCUMENTS

| 5,802,492 | A | 9/1998 | DeLorme et al. | |
|---|---|---|---|---|
| 5,948,040 | A | 9/1999 | DeLorme et al. | |
| 6,278,938 | B1 | 8/2001 | Alumbaugh | |
| 6,374,180 | B1 * | 4/2002 | Slominski et al. | 701/208 |
| 6,487,495 | B1 | 11/2002 | Gale et al. | |
| 6,498,982 | B2 * | 12/2002 | Bellesfield et al. | 701/202 |
| 7,020,612 | B2 * | 3/2006 | Tamura | 704/275 |
| 2003/0182052 | A1 * | 9/2003 | DeLorme et al. | 701/201 |
| 2004/0008225 | A1 | 1/2004 | Campbell | |
| 2004/0078813 | A1 | 4/2004 | Kobuya et al. | |
| 2004/0254723 | A1 | 12/2004 | Tu | |
| 2004/0260464 | A1 | 12/2004 | Wong | |
| 2004/0260465 | A1 * | 12/2004 | Tu | 701/209 |
| 2005/0080665 | A1 * | 4/2005 | Bowman-Amuah | 705/14 |
| 2005/0107993 | A1 * | 5/2005 | Cuthbert et al. | 703/2 |

OTHER PUBLICATIONS

Chen, Chaomei, Information Visualization, Oct. 21, 2004, Springer, 2nd edition, pp. 42-47.*
Microsoft MapPoint; The Power of Location http://www.microsoft.com/mappoint/locpower/default.mspx, last viewed Oct. 26, 2005.
Street Wizard; Locate an Address http://www.streetwizard.com/, last viewed Oct. 26, 2005.
Alk Technologies; GPS GPS Navigation for Everyone http://www.alk.com/, last viewed Oct. 26, 2005.
DeLorme; NEW—Earthmate GPS LT-20 for USB Laptop PCs http://www.delorme.com/consumer.htm, last viewed Oct. 26, 2005.

* cited by examiner

*Primary Examiner*—Khoi Tran
*Assistant Examiner*—Spencer Patton
(74) *Attorney, Agent, or Firm*—Shook, Hardy & Bacon L.L.P.

(57) ABSTRACT

A mechanism of rating, ranking and/or filtering landmarks located in a predefined geographic area is provided. More particularly, the subject mechanisms can facilitate rating landmarks and related criteria (e.g., points of interest (POI)) associated therewith. Thus, the mechanisms can facilitate intelligent rendering of landmark choices to users. The subject innovation facilitates rating the landmarks by analyzing items and entities in proximity to each landmark. A popularity index rating represents a sum of the number of POIs, number of commonly named entities and number of access routes to the landmark. Accordingly, this popularity index rating can allow users to rank, filter and sort landmarks in the order of popularity or interest thus maximizing available sightseeing time.

16 Claims, 12 Drawing Sheets

DATA ENGINE FOR RANKING POPULARITY OF LANDMARKS IN A GEOGRAPHICAL AREA

BACKGROUND

Vacationers and business travelers alike are frequently interested in locating landmarks and sites of significance when visiting a city. Landmarks can include sites and locales such as historical sites, architectural structures, and other locations of significant interest and/or importance. Traditionally, a traveler would research a destination city/location to identify "must see" locations. This research and decision making was done manually and sometimes took hours upon hours to complete.

As mapping applications continue to evolve on the Internet, there is an ongoing demand to provide additional focused and targeted information to users. Conventionally, mapping applications have been used primarily to provide users with directions to and/or from a particular location. As well, these applications sometimes provide additional generic information about the particular destination location.

By way of example, when planning for a business trip or vacation, a user can use a mapping application to easily request driving directions from one location to another. Additionally, these mapping applications can be employed to provide other information about a destination location. Many applications can assist a user to research a destination location with regard to "must see" locations.

Mapping applications today can assist in identification of well known landmarks and other "points of interest" (POIs) such as hot-spots, restaurants, theaters, hotels, etc. A listing of POIs can assist a user to plan a trip by providing the user with options and ideas regarding a destination location. However, traditional mapping applications do not provide information to assist a user to rank and/or narrow down a list of landmarks and/or POIs.

For instance, if a user travels to a large city, e.g., New York City (NYC), a landmark and POI list could include a seemingly unmanageable number of historical sites, hot-spots, restaurants and hotels. However, these applications are not equipped to intelligently assist a visitor and/or traveler to select particular sites to visit based upon POIs. As well, applications today do not provide any guidance regarding the popularity of any one POI from a complete list of POIs or other rating factors. Rather, mapping programs historically generate a laundry list of sites and POIs thereafter leaving any research, ranking, selecting and/or sorting to the user to plan details of their stay. Therefore, a user is oftentimes forced to sift through a voluminous number of landmark sites and PIOs when planning a visit or vacation.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system and methodology for ranking a landmark(s) and/or sites of interest. More particularly, the subject ranking mechanisms can facilitate ranking landmarks and criteria associated therewith (e.g., points of interest (POIs)) thus intelligently rating landmarks located in (or near) a defined area (e.g., city).

The subject innovation can be used in connection with mapping applications to facilitate rating, ranking, sorting and/or filtering landmarks by generating a popularity index associated with each landmark. Accordingly, these rating/ranking mechanisms can allow visitors (e.g., travelers) to choose from a list of landmarks based upon popularity or interest thus effectively maximizing available sightseeing time.

One novel feature of the subject landmark ranking and/or filtering mechanism is to identify and deliver the most popular and/or interesting landmarks to a user. In one aspect, the system can employ an algorithm to generate a popularity index rating. More particularly, for each landmark identified, a popularity index can be generated by identifying factors such as POIs, commonly named entities, access routes, etc. One aspect considers a sum of the identified number of factors. Other aspects apply weights to particular factors based upon preference, popularity, interest, availability, etc.

In still another aspect, a sum of the above three components, number of POIs, number of commonly named entities and number of access routes can be combined to generate the popularity index and effectively a popularity rating and/or rank. The landmark rating and/or rank can be employed to sort the landmarks thus facilitating rendering a short list of landmarks to a user based upon popularity and/or interest.

In yet another aspect thereof, an artificial intelligence (AI) component is provided that employs a probabilistic and/or statistical-based analysis to prognose or infer a user preference. For example, an AI component can be employed to automatically infer an applicable geographical area for which to identify index factors (e.g., POIs). Additionally, still another aspect can employ rules-based logic to effect implementation of identifying, ranking, sorting and/or filtering of landmarks.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
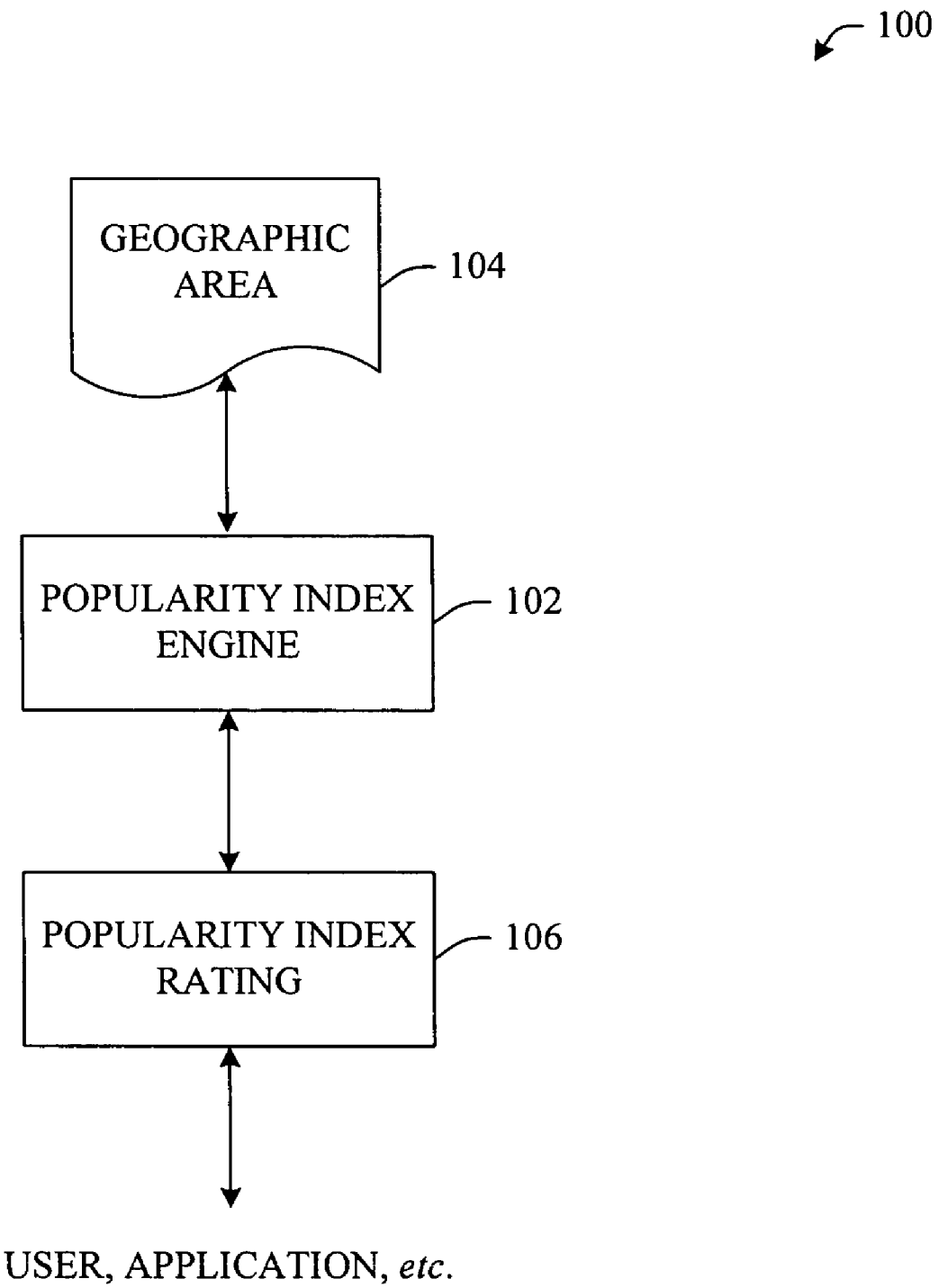
FIG. 1 illustrates a general component block diagram of a system that generates a landmark popularity index rating in accordance with an aspect of the subject innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As described above, traditionally, users can find sites of significant interest (e.g., landmarks) in a given city or locale using any mapping product. However, conventional applications do not facilitate rating and/or ranking the landmarks by popularity or in accordance with a user preference. Lack of such feature requires users to manually perform research outside the mapping products to make a short list of places to visit when time is limited.

The subject system employs a landmark ranking algorithm that enables users to rank the landmarks and places of interest. For example, the subject system can be employed within or in conjunction with a mapping product to rate and/or rank places of interest in a city or other specified location. In one aspect, the rating/ranking system can provide a user with suggestions from which a user can choose popular landmarks to visit.

Referring initially to FIG. 1, a system 100 that facilitates rating places of significant interest (e.g., landmarks) in accordance with one aspect of the innovation is shown. Although the examples described herein are directed to rating and/or ranking landmarks in a particular destination location, it is to be appreciated that the novel features and functionality described herein can be applied to any type of location.

Generally, FIG. 1 includes a popularity index engine 102 that receives data relating to a geographic area 104. Accordingly, in one aspect, the popularity index engine 102 can access a database (local or remote) thereby identifying one or more landmarks in proximity to the geographic area. Additionally, the popularity index engine can facilitate establishing a popularity index for each of the identified landmarks. The index can be based upon any predefined factors. As will be described in greater detail below, the index can be based upon popularity as well as other factors.

In general, the popularity index engine 102 can establish a popularity index rating 106 that corresponds to each particular landmark. This popularity index rating 106 can be useful in assisting a user in planning a trip or visit. For example, the popularity index rating 106 can provide a user with a benchmark of popularity or interest with regard to a site. Essentially, the popularity index engine 102 can automatically facilitate research and hierarchically rank landmarks based upon any predefined criteria or factors. Individual mechanisms and methodologies of ranking and filtering will be better understood upon a review of figures that follow.

Geographic area 104 is representative of any identifying data related to a location. For example, the geographic area 104 can be representative of a city (e.g., Seattle). As well, geographic area 104 can be representative of a state or even a region. It is to be appreciated that geographic area 104 can be descriptive of any physical place whereas, the popularity index engine 102 can identify and rate places of significance (e.g., landmarks) within the geographic area 104.

One novel feature of the subject landmark ranking and/or filtering mechanism is to identify and suggest the most relevant information to a user. As will be described in more detail below, users oftentimes have very little time when visiting a city. For this reason it is particularly useful to render landmarks based upon the popularity of each individual landmark. This mechanism can enable a user to maximize limited time in a location while at the same time enabling the user to visit sites of particular interest and/or popularity.

Figure 2:
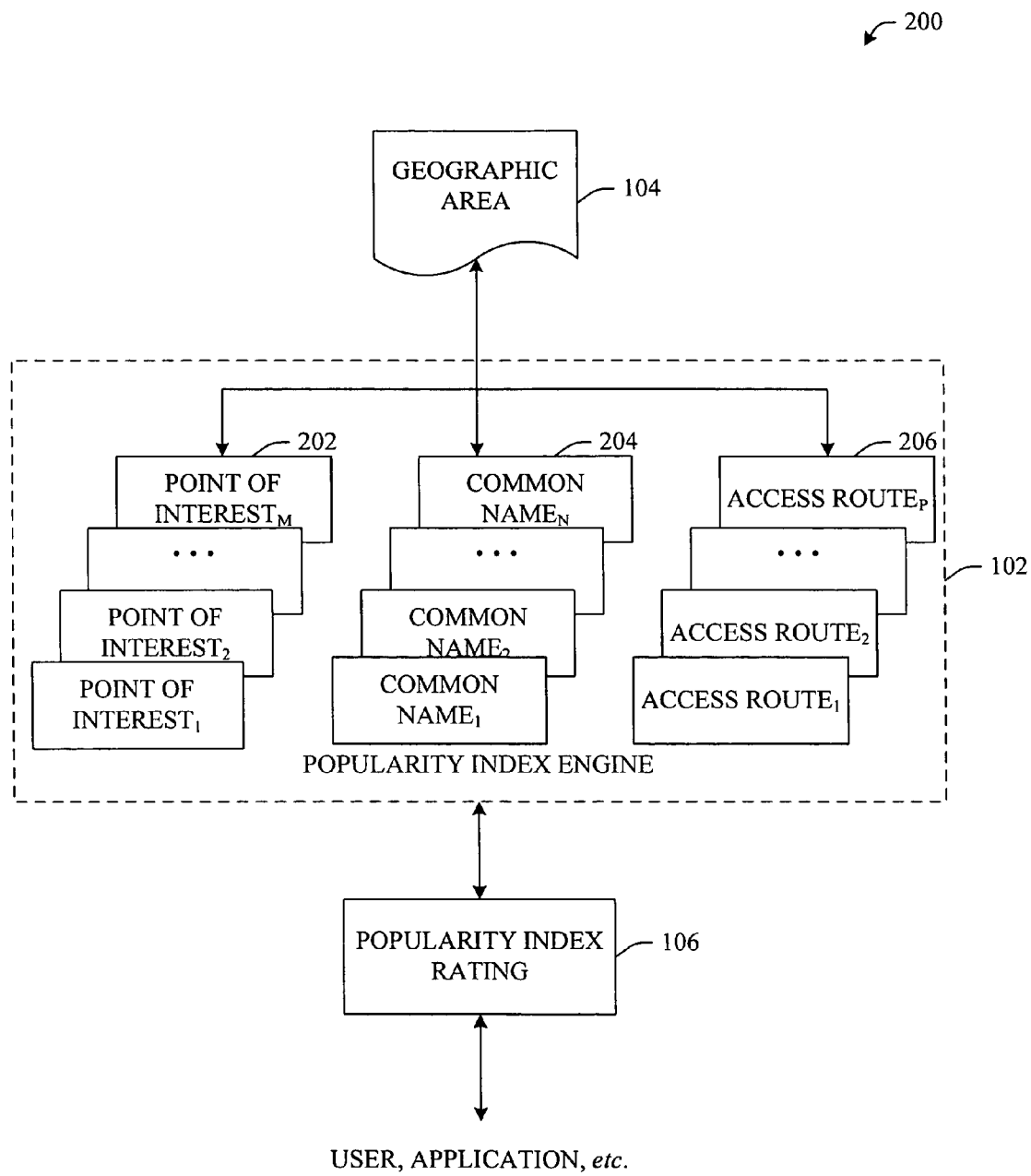
FIG. 2 illustrates an exemplary architectural diagram of a system that employs points of interest, commonly named entities, and access route criteria to facilitate a landmark rating mechanism.

Referring now to FIG. 2, the popularity index engine 102 can employ an algorithm(s) to arrange landmarks in order by generating an index and thus a popularity index rating 106 thereafter. It will be appreciated that a software product equipped with the novel landmark ranking algorithm can allow travelers to intelligently plan a visit to a city while maximizing available time to see the most popular landmarks. Effectively, users can employ the popularity index rating 106 to sort landmarks and other sites in the order of popularity or interest thus effectively maximizing time while visiting.

Illustrated in FIG. 2 is an architectural diagram of system 200 that facilitates generation of the popularity index rating 106. More particularly, popularity index engine component 102 can employ various factors in determining a popularity index rating 106. Although specific factors are illustrated in FIG. 2 with respect to the popularity index engine 102, it is to be understood that all or a subset of these factors can be employed in an algorithmic manner to determine the popularity index rating 106. Exemplary algorithms will be described in greater detail infra with reference to the figures that follow.

The popularity index engine 102 can employ any desired criteria (e.g., factors) in determining the popularity index rating 106. The aspect illustrated in FIG. 2 can employ points of interest (POIs) 202, entities that share a common (or similar) name 204 and access routes 206 (e.g., transportation infrastructure) in determining the popularity index rating 106.

As described supra, conventional mapping programs continue to evolve to provide users with the most informative experience. The landmark ranking mechanisms (e.g., popularity index engine 102) described herein can be employed with any platform that can provide geographic related data. As well, it is to be understood and appreciated that the subject system can be employed in connection with any hardware device and/or system. By way of example, the subject mechanisms can be utilized with the assistance of a personal computer, handheld computer, smart phone, personal data assistant or the like. For example, looking at specific geographical area (e.g., Seattle area), the popularity index engine 102 can be employed to identify and deliver the most popular and/or interesting sites (e.g., landmarks) to a user. By way of further example, the popularity index engine 102 can facilitate ranking, sorting and/or filtering a large number of sites to identify the most popular and/or interesting sites to a given user.

Conventionally, mapping applications could merely return a list of landmarks without any analysis, sorting and/or filtering. Rather, the subject mechanisms described herein are capable of creating a "short list" of landmarks in view of relevant factors.

As such, the subject popularity index engine 102 can consider the relationship of the landmark to other locations and/or factors. In doing so, the popularity index engine 102 can consider the landmark itself together with other entities and entities in a predetermined area that surrounds it. More particularly, the popularity index engine 102 can consider other factors such as POIs in proximity to the landmark 202, entities that share a common (or similar) name with the landmark 204, and transportation infrastructure or access routes 206 to the landmark. Thus, the popularity index engine 102 can more accurately, based upon popularity, render a short list of landmarks to a user.

The popularity index engine 102 can consider 1 to M POIs, where M is an integer. It is to be appreciated that 1 to M POIs can be referred to collectively or individually as POIs 202. By way of example, a POI 202 can be a hotel, restaurant, night club, hot spot, etc. in proximity to a landmark. A threshold to determine proximity can be defined by a radius, perimeter, or other area defining boundary that surrounds the landmark. This boundary can predefined by a user or inferred based upon the type of landmark, real time and/or expected weather conditions, time of day, etc.

As well, the popularity index engine 102 can consider other entities that share a common name with the landmark. It is to be understood that the popularity engine 102 can consider common (or similarly) named entities 1 to N, where N is an integer. It is to be appreciated that 1 to N common named entities can be referred to collectively or individually as common named entities 204.

By way of example and not limitation, suppose a user is considering a visit to the Space Needle in Seattle, Wash. The popularity index engine 102 can determine a number of entities that share the same or similar name as the Space Needle. For instance, if there exists a Space Needle Restaurant, Space Needle Hotel and a Space Kneadle Bakery within a predetermined or inferred boundary, these factors will be considered in determining the popularity index rating 106.

Continuing with the example, the popularity index engine 102 can consider 1 to P access routes to the landmark, where P is an integer. These 1 to P access routes 206 can represent any path granting access to the landmark. Additionally, it is to be understood that the subject ranking mechanisms can consider weights of particular factors (e.g., 202, 204, 206) whereby more weight can be given to one factor over another. For example, suppose a user is more interested in POIs within walking distance (e.g., radius, perimeter). Accordingly, the POI factor can be given more weight than the Common Name and/or Access Route factors in determining the popularity index rating 106.

Additionally, temporal factors (e.g., time) can be considered to determine popularity and/or interest on a given day, time of day, season, etc. By way of example, a museum landmark may be more desirable in cold winter months than a beach venue. Moreover, the type landmark can be considered to assist in intelligently rendering suggested landmarks to a user. By considering all, or a subset of these factors, the popularity index engine 102 can generate a popularity index rating 106 for each landmark in a geographic area 106 thereby presenting a short list to a user. Although specific criteria and factors are shown in FIG. 2, it is to be understood and appreciated that other factors (e.g., demographics, weather, age of landmark, age of traveler) can be considered and thereafter included into the identification and ranking mechanisms herein. For example, a younger traveler might be more interested in night life and hot spots. Accordingly, these types of rating factors can be given more weight than other factors in order to adhere to a user preference. These additional factors are to be considered within the scope of this specification and claims appended hereto.

Figure 3:
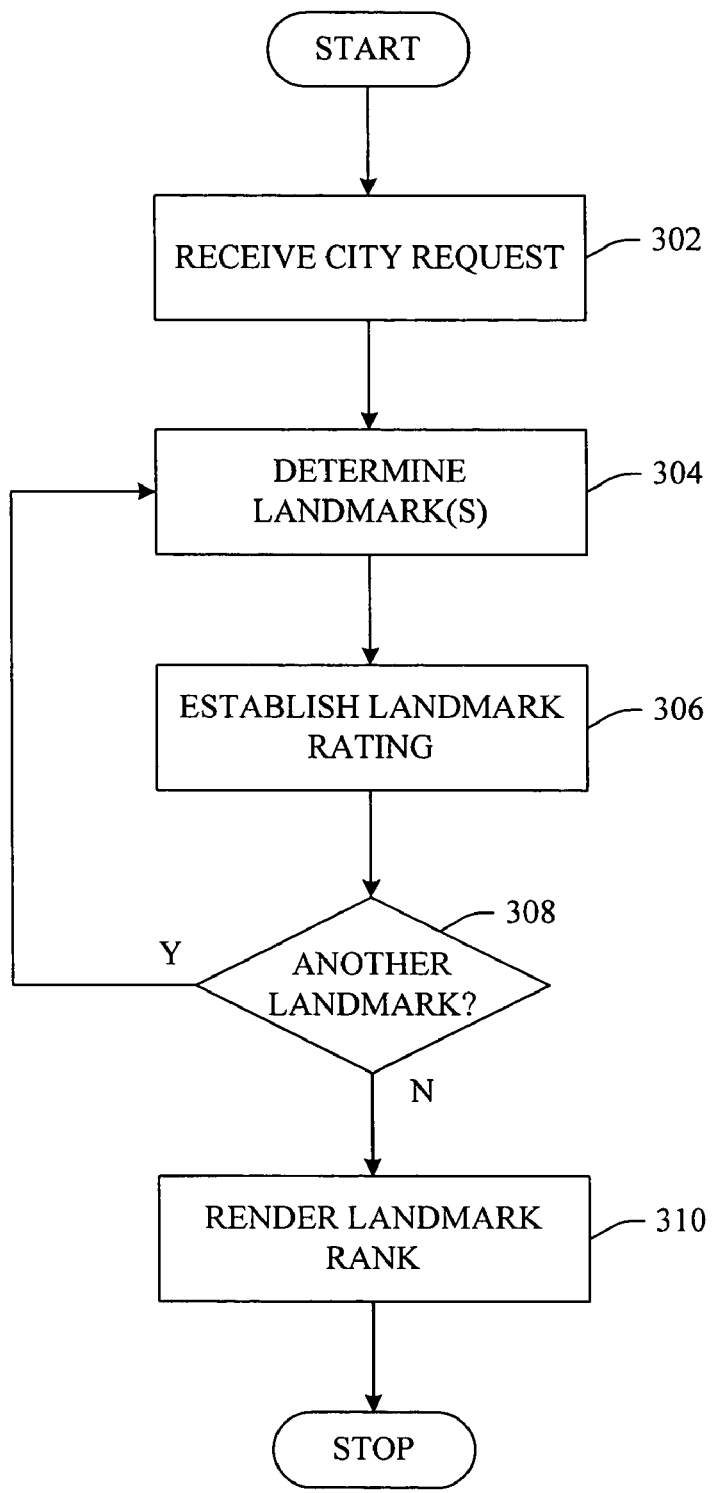
FIG. 3 illustrates an exemplary flow chart of procedures for rating landmarks in accordance with a disclosed aspect.

FIG. 3 illustrates a methodology of ranking landmarks in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 302, a city request (or geographical area request) is received. Once received, the city and/or geographical area can be analyzed at 304. It will be appreciated that landmarks and corresponding POIs, common name entities, transportation infrastructures, etc. can be determined as a result of this analysis. Additionally, other factors can be obtained which correspond to the received landmark. For example, time of day, time of year, weather, etc. can be determined and subsequently weighed into a ranking of the landmark at 306.

Although aspects described herein are directed to employing a numerical value that represents a number of POIs, common name entities, access routes, etc., it is to be understood that other aspects can employ additional factors with respect to determining a rank of a particular landmark. By way of example, applicable POIs, common name entities, access routes, etc. can also be analyzed thus establishing a weight in addition to a numerical value of the number of items. This weight can then be factored into the determination of the landmark rating 306. For instance, if one landmark has 3 five-star hotels within a given predefined distance whereas another landmark only has 1 motel. It will be understood and appreciated that a greater weight can be applied to the landmark near the five-star hotels. Accordingly, the increased weight of the POIs can be factored into establishing a landmark rating at 306 in accordance with a predetermined and/or inferred preference.

A determination can be made at 308 which enables a recursive mechanism of rating additional landmarks. If additional landmarks are determined at 304, the methodology can return to 304 thereby analyzing the additional landmark(s) and thereafter establishing a corresponding landmark rating. If, on the other hand, additional landmarks are not identified, the landmark ranks can be rendered to a user at 310.

It is to be understood and appreciated that the rated landmarks can be rendered (e.g., displayed) to a user in any format. In one aspect, the landmarks can be ranked based upon the overall rating determined at 306. In another aspect, the landmarks can be ranked based upon a rating that considers an isolated factor (e.g., number of POIs). Moreover, the landmarks can be filtered based upon any desired criteria thus, limiting the number of items in a resultant set to a user. The act of filtering can include filtering, ranking and/or sorting landmarks based upon the item-specific rating established at 306.

Figure 4:
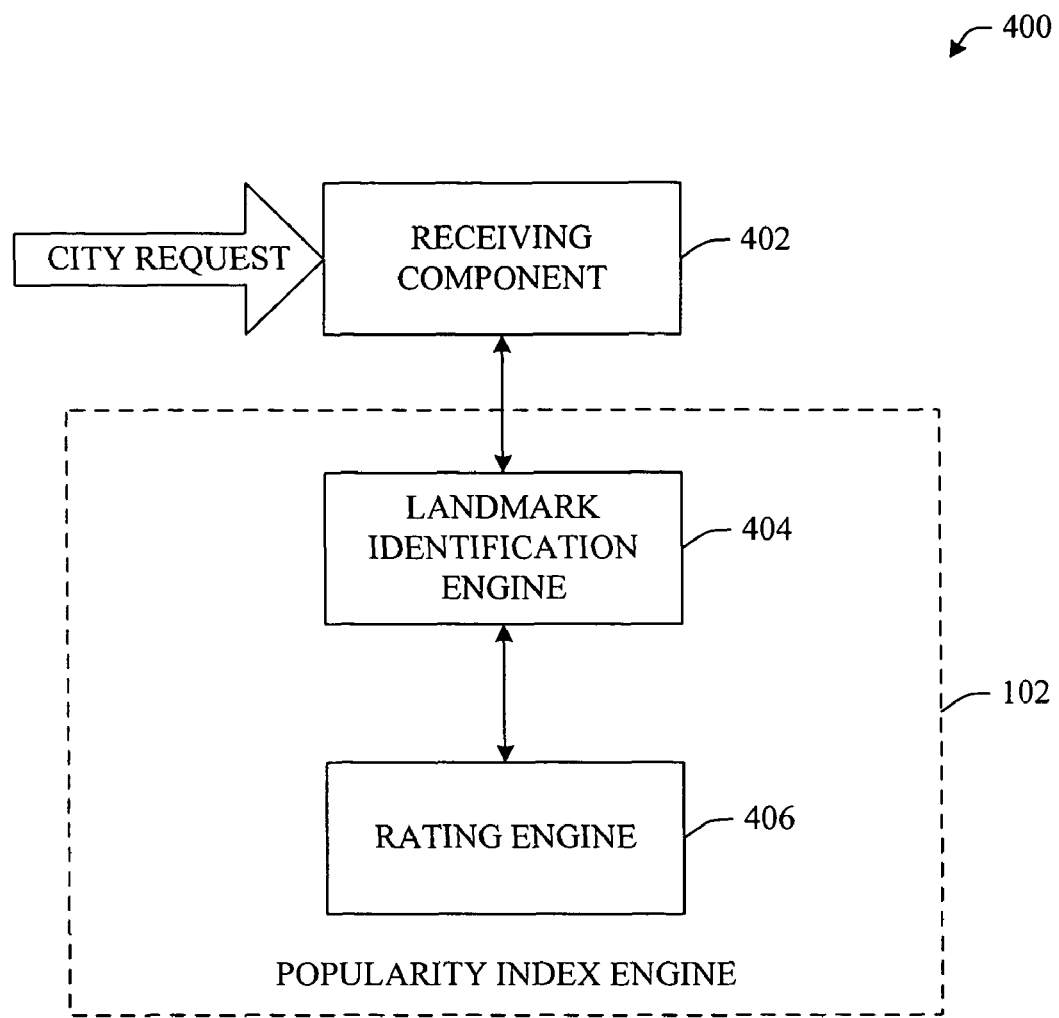
FIG. 4 illustrates a general block diagram of a system that employs a landmark identification engine and a rating engine in accordance with an aspect of the subject invention.

Turning now to FIG. 4, a system 400 that facilitates rating a landmark in accordance with an aspect of the rating mechanism is shown. Generally, system 400 can include a receiving component 402 and a popularity index engine 102. In operation, the receiving component 402 facilitates receiving a request that corresponds to a geographic area or city. In one aspect, the receiving component 402 can accept manual requests from a user while other aspects employ automated mechanisms via receiving component 402. For instance, other aspects exist that automatically request landmark information with respect to a particular city or geographic area. These automated aspects can be particularly useful for industries such as hotels, airlines, etc. In these aspects, when a traveler books a reservation to visit a particular area, an automatic request can be generated thereby prompting identification and subsequent ranking of nearby landmarks and/or sites to visit.

The popularity index engine 102 can include a landmark identification engine 404 and a rating engine 406. The landmark identification engine 404 can facilitate identifying landmarks located within a predetermined or inferred boundary of a city or other geographic area. Once identified, the rating engine 406 can determine factors (e.g., POIs, common name entities, access routes) that correspond to the landmark. Subsequently, the rating engine 406 can employ the determined factors thereby establishing a rating (e.g., popularity index). As will be described infra, this rating can be used to rank, filter and/or sort the landmark with respect to other identified landmarks.

It is to be appreciated that artificial intelligence (AI) reasoning and/or rules-based logic can be employed in connection with the popularity index engine 102 and components associated therewith (e.g., landmark identification engine 404, rating engine 406). These alternative aspects will be described in greater detail with reference to FIGS. 8 and 9 infra.

Figure 5:
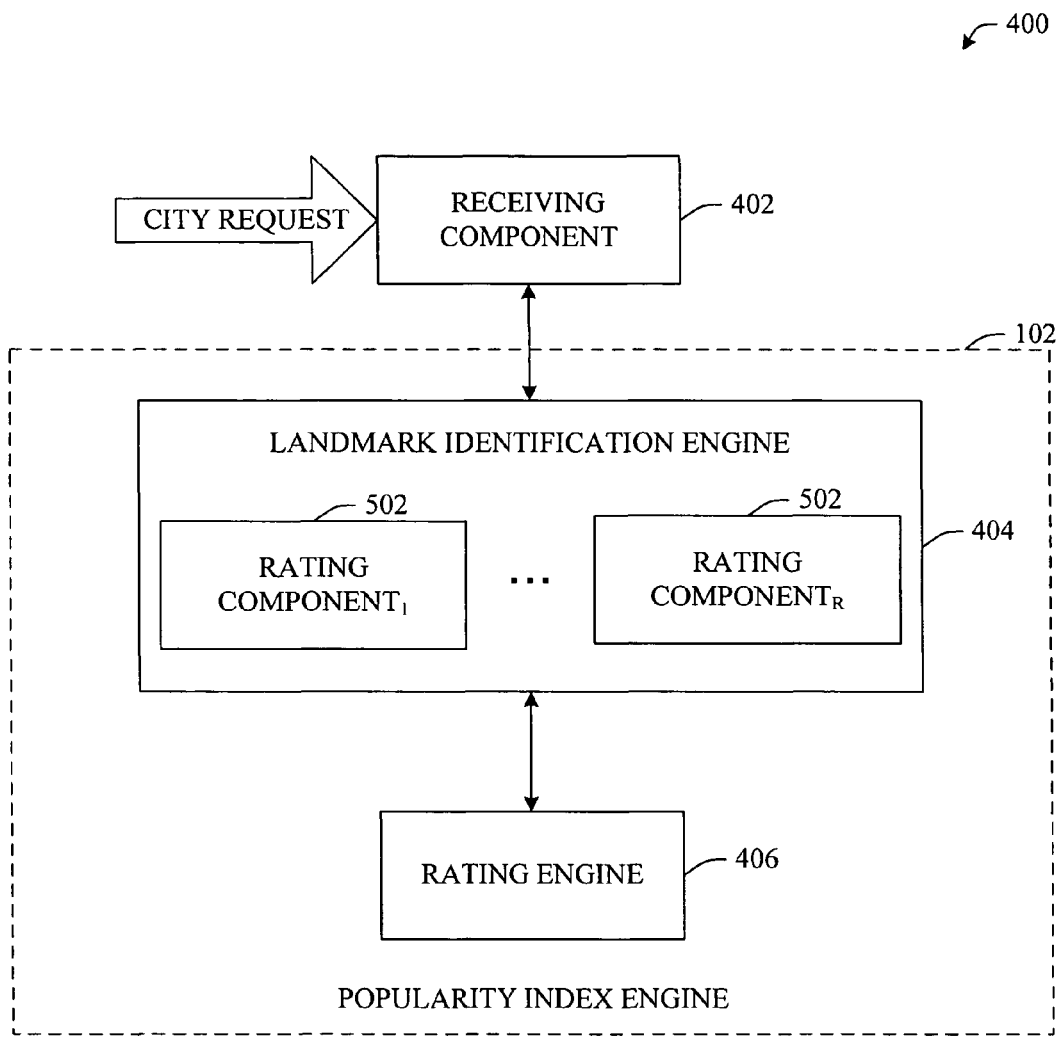
FIG. 5 illustrates a general block diagram that illustrates multiple rating components included within a landmark identification engine in accordance with an aspect of the subject invention.

Illustrated in FIG. 5 is yet another block diagram of system 400 in accordance with an aspect of the landmark rating mechanisms. In particular, landmark identification engine 404 can include 1 to R rating components, where R is an integer. It is to be appreciated that rating components 1 to R can be referred to individually or collectively as rating components 502. As described above, aspects can be configured to consider any desired rating component into an overall rating of a landmark. This rating can be established via rating engine 406 which can employ the rating components 502 as well as optionally applicable weight factors thus determining a popularity index rating.

Figure 6:
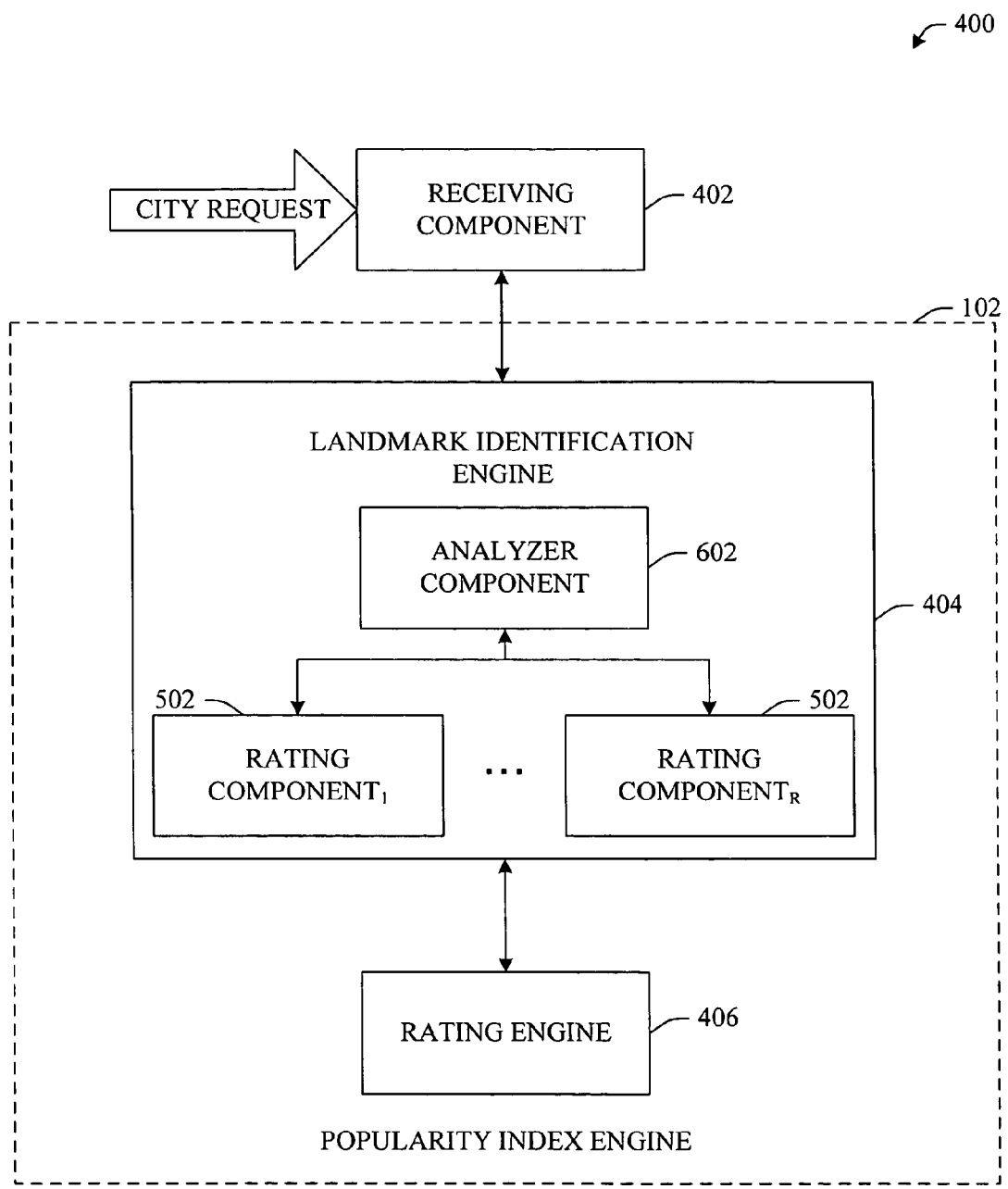
FIG. 6 illustrates a general component block diagram of a system that includes an analyzer component in accordance with an aspect of the subject invention.

Additionally, as illustrated in FIG. 6, the landmark identification engine 404 can employ an analyzer component 602 that facilitates identification of landmarks in a given area (e.g., city, state, region) as well as rating factors 502 that correspond to each of the identified landmarks. For example, the analyzer component 602 can employ local or remote means (e.g., data store, Internet) to determine landmarks in a requested city and/or area. Additionally, once a landmark(s) is determined the analyzer component 602 can interrogate additional sources (e.g., Internet, local data stores, remote data stores) to obtain relevant rating components 502 (e.g., POIs).

The rating engine 406 can employ an output from the landmark identification engine 404 and accordingly determine an appropriate rating based at least in part upon a rating component(s) 502. As well, rating engine 406 can consider other user defined and/or inferred threshold values and limits when determining a particular rating of a landmark.

Figure 7:
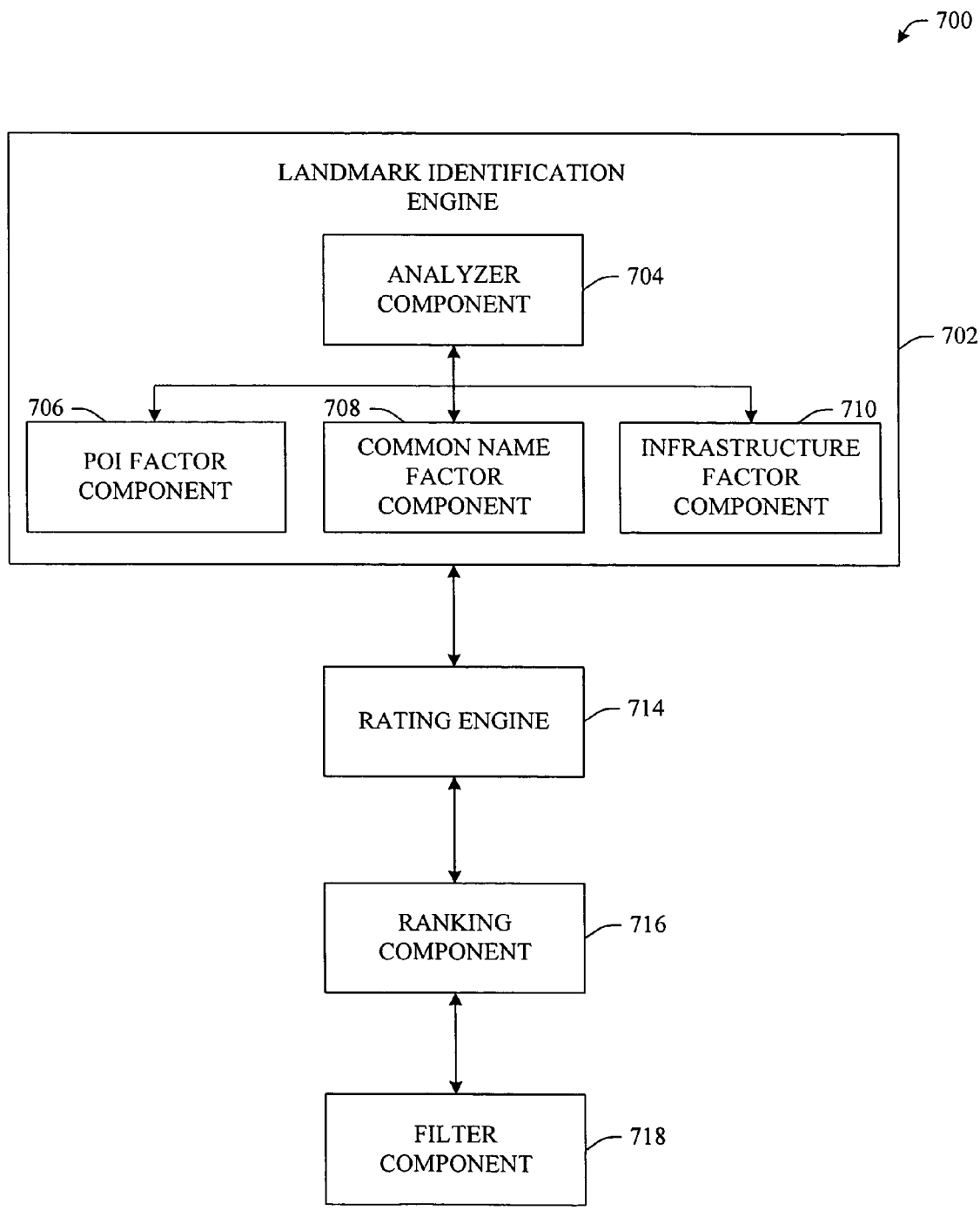
FIG. 7 illustrates a general component block diagram of a system for generating a popularity rank via an exemplary algorithmic mechanism in accordance with an aspect of the subject invention.

FIG. 7 illustrates a more specific example of a system 700 that ranks a landmark in accordance with an aspect of the invention. It is to be understood and appreciated that, although FIG. 7 illustrates an aspect that employs specific criteria, other aspects exist that employ additional and/or modified versions of the criteria shown. These additional aspects are to be considered within the scope of this invention and claims appended hereto.

System 700 generally includes a landmark identification engine 702 that facilitates identifying a landmark(s) and/or rating criteria. More particularly, landmark identification engine 702 can include an analyzer component 704 that identifies a landmark or group of landmarks that corresponds to a desired city/area. Additionally, the analyzer component 704 can facilitate identifying rating factors that correspond to each of the identified landmarks. As shown in the aspect of FIG. 7, a POI factor component 706, a common name factor component 708 and an infrastructure factor component 710 can be identified. Although specific rating factor components (706, 708, 710) are illustrated in FIG. 7, it is to be understood that other factors can be employed to facilitate rating a landmark or site.

A rating engine 714 can be provided that employs a landmark rating algorithm to rate the landmark(s) locations in a city. Effectively, the rating engine 714 can build a popularity context or index. In the example illustrated in FIG. 7, a popularity context of a particular landmark can be calculated using several attributes of the landmark location.

More particularly, the rating engine 714 can consider a number of commercial and non-commercial entities or POIs within a pre-specified or inferred distance (e.g., radius, perimeter, boundary) from a landmark. This number of POIs is represented in FIG. 7 as a POI factor 706. As described earlier, other aspects can also consider weights associated to specific POI factors 706 in determining a landmark rating.

Entities that share a common, or similar, name with the identified landmark(s) can also be considered in accordance with the aspect of FIG. 7. For example, if all, or a portion of, the landmark name is used in a name of another entity within the predefined or inferred distance, this entity can be considered in rating the instant landmark. A total number of commonly (or similarly) named entities will be considered. Moreover, these entities can also employ weight components in determining a rating. It is to be understood and appreciated that a fuzzy name matching mechanism can be employed to determine similarly named entities. The criteria and/or specifications of the matching mechanism can be user defined and/or inferred from the type or name of the landmark.

Still another rating factor considered in the example of FIG. 7 is an infrastructure factor component 710. In other words, the analyzer engine 704 can determine, and the rating engine 714 can employ, the number of streets (e.g., access routes) that lead to the identified landmark(s). As well, the rating engine 714 can consider the types of streets or access routes (e.g., pedestrian only vs. car only vs. truck only, etc.) by applying appropriate weights thereto. Moreover, the infrastructure factor component 710 can include a component that identifies if public transportation is available to, or within a defined distance from the landmark.

A ranking component 716 and/or filter component 718 can be employed to more intelligently render resultant data to a user. For example, the ranking component 716 can facilitate hierarchically sorting the landmark ratings generated by the rating engine 714. In other words, the ranking component 716 can compare all rated landmarks thus compiling a short list that can be rendered to a user.

Additionally, a filter component 718 can be employed to further personalize the landmark list. For example, if a user is only interested in museum venues, the filter component 718 can facilitate rendering a subset of the ranked landmarks in accordance with a predetermined query or filter constraint (e.g., museum venue). It will be understood that one novel feature of landmark ranking is that it does not necessarily return the "touristy" spots on the top but rather can recommend locations of interest based upon popular gathering locations, etc.

Figure 8:
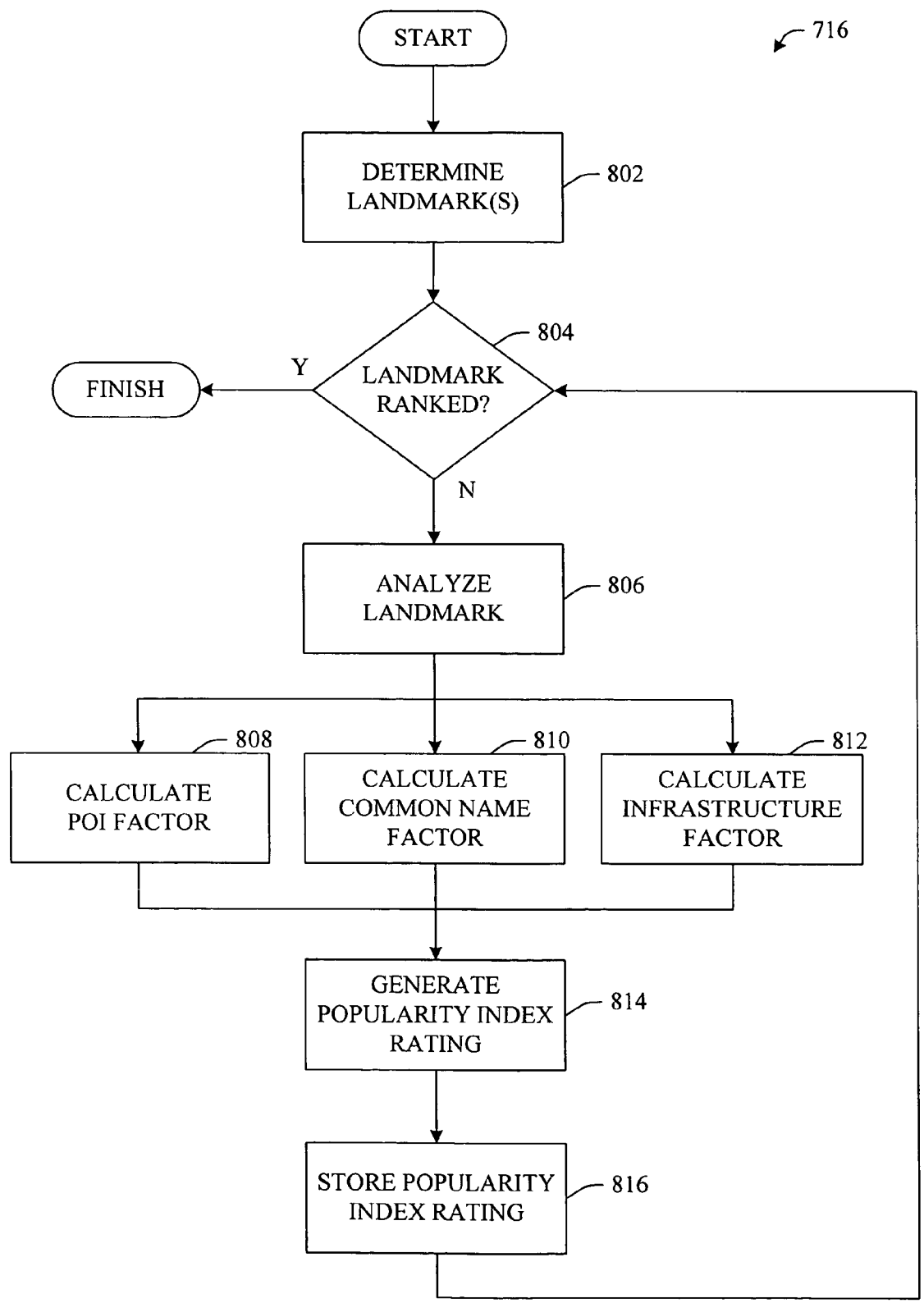
FIG. 8 illustrates an exemplary flow chart of procedures for establishing a landmark rank in accordance with a disclosed aspect.

FIG. 8 illustrates a methodology of computing a landmark rank in accordance with the aspect of FIG. 7. More particularly, FIG. 8 illustrates a summarization of an algorithm in accordance with an aspect of the landmark rating/ranking mechanism. Initially, at 802 a determination of landmarks within a predefined and/or inferred distance is generated. As described above, this determination can be prompted by a request and can be made from information relating to a city and/or geographic area identified in the request.

At 804, a determination is made if the instant landmark is rated and/or ranked. If so, a stop block is reached. If the instant landmark is not yet ranked, at 806, the landmark is analyzed. This analysis can include identifying POIs, common name entities, access routes, and other relevant rating factors. At 808, 810 and 812, a POI factor, common name factor and infrastructure factor can be calculated respectively. It is to be understood and appreciated that the calculation of these factors can be implemented in any order. As well, weights can be applied as appropriate and as described above.

A popularity index rating is generated at 814. Effectively, in one aspect, the number of POIs, commonly named entities and number of access routes can be added to establish the landmark rating at 814. The established popularity index rating can be stored locally or remotely at 816. As illustrated, the methodology is recursive. In other words, once a popularity index rating is established for a landmark, the methodology returns to 804 where a determination is made if additional unrated landmarks exist. If so, another popularity index rating can be determined and stored for the new item(s). If not, a stop block is reached.

Once stored, it will be appreciated that the landmarks can be aggregated, ranked, sorted and/or filtered based at least in part upon the popularity index rating. It will be understood that these mechanisms and methodologies can facilitate identification and delivery of more focused landmark suggestions based at least in part upon POIs, commonly named entities, transportation infrastructure, interest, time/date of visit, popularity, years in existence, etc.

Figure 9:
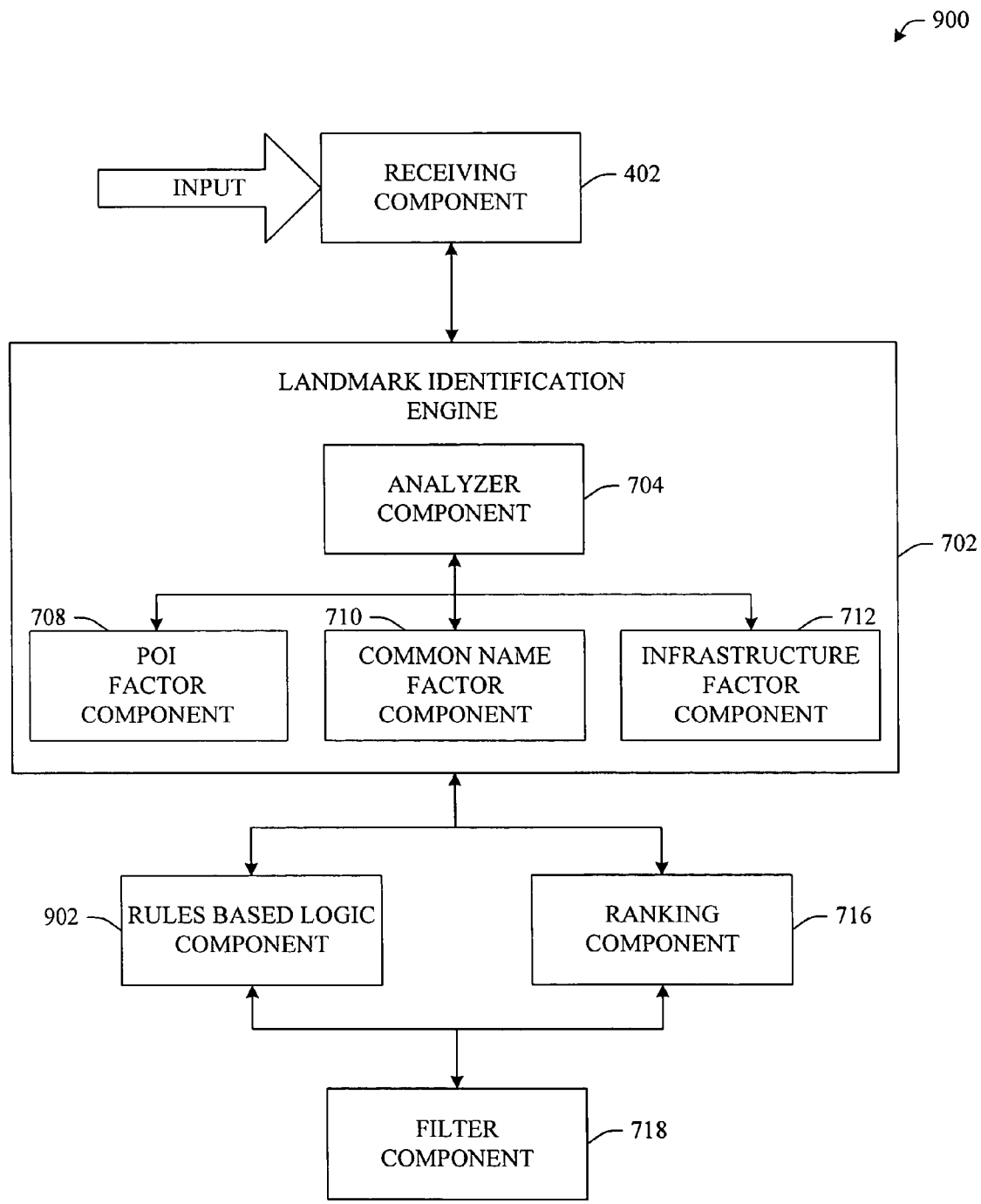
FIG. 9 illustrates a landmark ranking system that includes rule-based mechanisms in accordance with an aspect of the invention.

With reference now to FIG. 9, an alternate aspect of a landmark ranking system 900 is shown. In particular, system 900 includes a rule based logic component 902. In accordance with this alternate aspect, an implementation scheme (e.g., rule) can be applied to define and/or implement a ranking scheme. It will be appreciated that the rule-based implementation can define constants, weights and/or thresholds (e.g., radius, perimeter, boundary) associated with identifying, ranking, sorting and filtering landmarks and corresponding criteria. In response thereto, the rule-based implementation can facilitate selection of landmarks based upon a calculated popularity index by employing a predefined and/or programmed rule(s).

It will be appreciated that any of the specifications utilized in accordance with the subject invention can be programmed into a rule-based implementation scheme. In the exemplary aspect of FIG. 9, the rule based logic component 902 can be programmed or configured in accordance with any user-defined preference.

Figure 10:
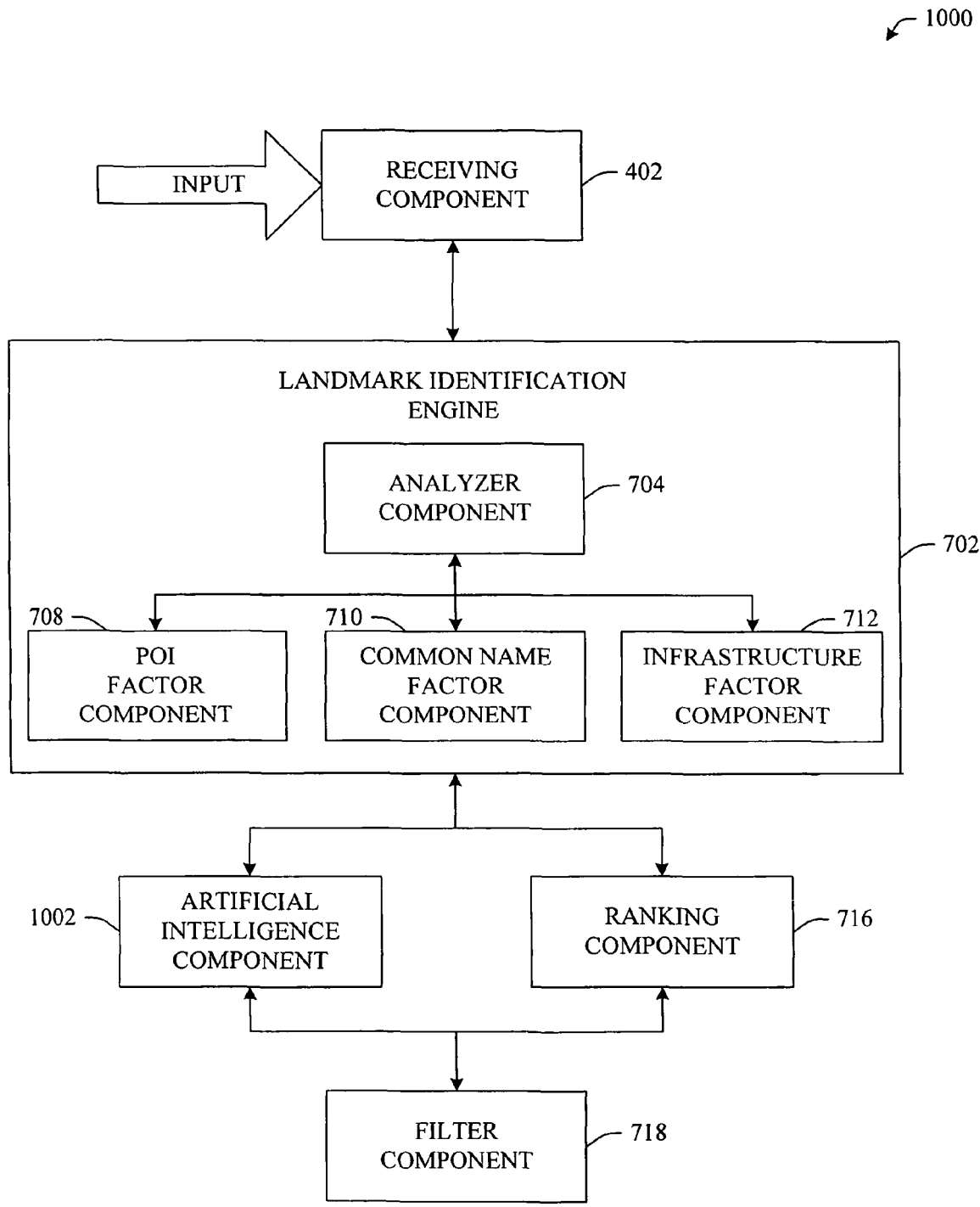
FIG. 10 illustrates a landmark ranking system that includes artificial intelligence-based mechanisms in accordance with an aspect of the invention.

FIG. 10 illustrates a landmark ranking system 1000 that employs an AI component 1002 which facilitates automating one or more features in accordance with the subject innovation. It is to be understood that this AI component 1002 can be employed in addition to, or in place of the rules-based logic component 902 shown in FIG. 9.

The subject invention (e.g., in connection with identification, ranking, sorting, filtering) can employ various AI-based schemes for carrying out various aspects thereof. For example, a process for determining a user preference to be employed in the popularity index generation can be facilitated via an automatic classifier system and process.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. In the case of landmark rating/ranking, for example, attributes can be word or phrases or other data-specific attributes derived from the words or name of the landmark (e.g., presence of key terms), and the classes are categories or areas of interest (e.g., types of landmarks).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining, according to a predetermined criteria, when a particular criteria should be given special weight, when to consider landmark corresponding criteria (e.g., POI), when to identify a landmark, what a user preference is with respect to landmark at a given time, etc.

Figure 11:
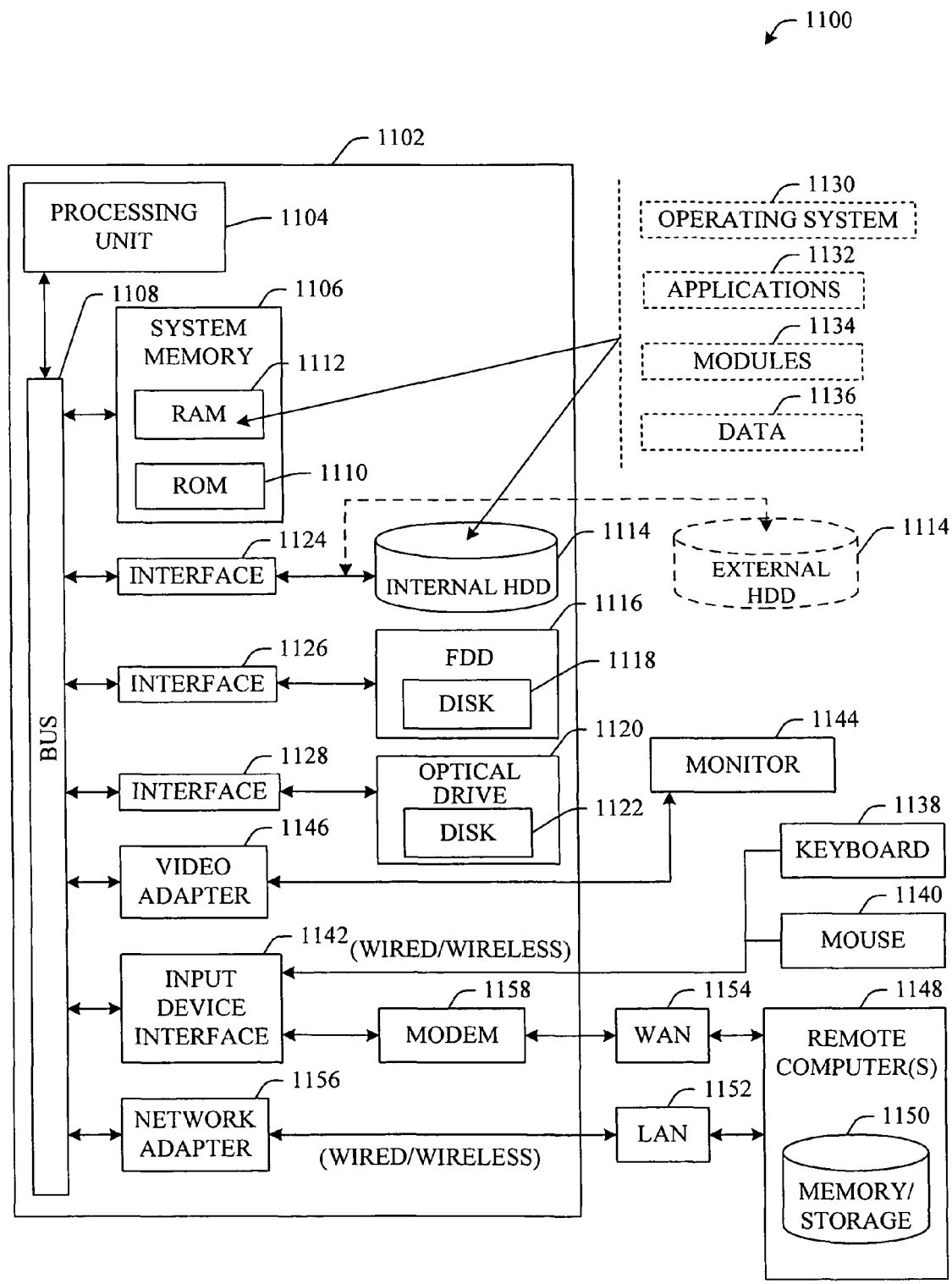
FIG. 11 illustrates a block diagram of a computer operable to execute the disclosed architecture of rating and/or ranking landmarks.

Referring now to FIG. 11, there is illustrated a block diagram of a computer operable to execute the disclosed architecture with respect to rating/ranking landmarks. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
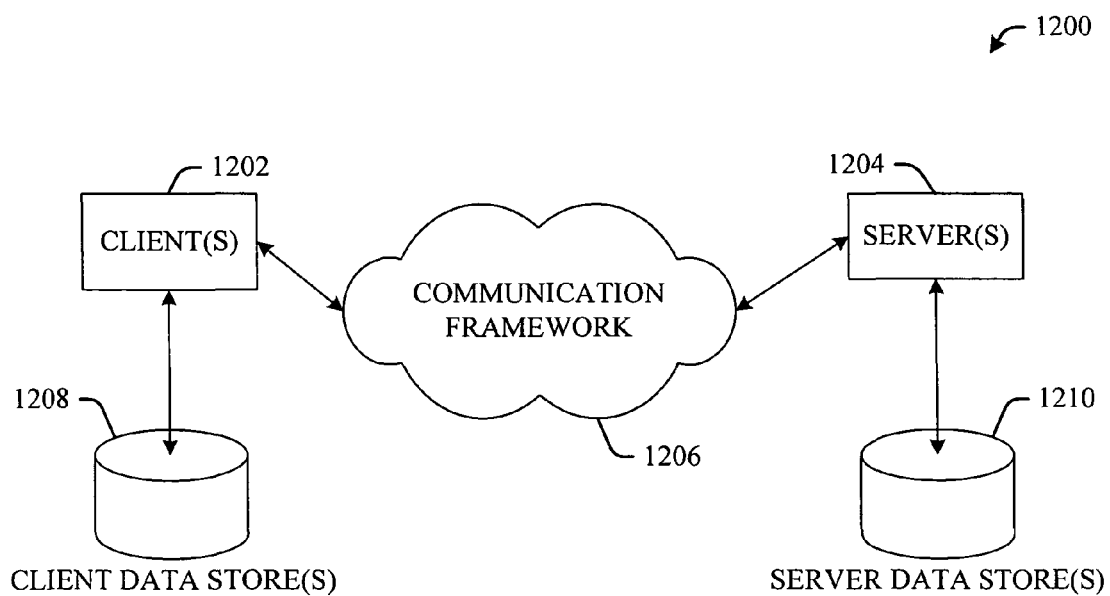
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject landmark rating mechanism(s). The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates ranking landmarks within a geographical area, comprising:
   a data reception component configured to receive data that identifies the geographical area;
   a processor configured to access a database to identify a landmark located within the identified geographical area and to construct a popularity index relating to the landmark, the popularity index is constructed by factoring a quantity of access routes to the identified landmark, a quantity of additional landmarks within a defined distance from the identified landmark, and a common name factor, wherein the quantity of access routes represents a numerical value of access routes that grant access to the landmark and the common name factor includes other landmarks that share at least part of a name with the identified landmark; and a rating component configured to establish a rating of the identified landmark based at least in part upon the popularity index, wherein the rating component applies a separate weight value to both the quantity of access routes and the common name factor, and wherein the rating is at least one of stored on a computer readable storage medium, displayed on a display device, employed by one or more processes executed on one or more processors, or transmitted between two or more processes executing on one or more processors.

2. The system of claim 1, wherein the data identifies a city.

3. The system of claim 1, further comprising a ranking component configured to rank the identified landmark against one or more disparate landmarks based at least in part upon the rating and one or more disparate ratings that correspond to the one or more disparate landmarks.

4. The system of claim 3, wherein the system displays the identified landmark and the one or more disparate landmarks in order of the popularity index associated with the landmark and the one or more disparate landmarks such that a landmark with a highest popularity index is displayed first.

5. The system of claim 1, wherein the geographical area is defined by a radius, the radius is based at least in part upon a user defined preference.

6. The system of claim 1, wherein the rating component performs a summation of each of the popularity index factors to determine the popularity index.

7. The system of claim 1, wherein the processor analyzes temporal factors to determine the popularity index, wherein the temporal factors include a time of day or a time of year.

8. The system of claim 1, wherein the processor analyzes demographic information of a user to determine the popularity index, wherein the demographic information includes age of the user.

9. A computer-implemented method in a computerized environment for ranking landmarks within a geographical area, the method comprising:
    identifying a geographical area, wherein the geographical area is a city;
    identifying a landmark located within the geographical area;
    determining, utilizing a first computer process, a popularity index for the landmark located within the geographical area, wherein determining the popularity index includes:
        (i) identifying a quantity of access routes that grant access to the landmark, wherein the quantity of access routes represents a numerical value of access routes that grant access to the landmark;
        (ii) identifying a quantity of additional landmarks within a defined distance from the landmark; and
        (iii) identifying a common name factor, wherein the common name factor includes others other landmarks that share at least a part of a name with the landmark;
    rating, utilizing a second computer process, the landmark based at least in part on the popularity index, wherein rating the landmark includes applying a separate weight value to each of the quantity of access routes, the quantity of additional landmarks within a defined distance from the landmark, and the common name factor, and wherein the weight factor is determined based on user preference; and
    displaying the rating of the landmark,
    wherein the first and second computer processes are executed utilizing one or more computing devices.

10. The method of claim 9, wherein determining the popularity index further includes identifying demographic information of a user.

11. The method of claim 10, wherein the demographic information of a user is an age of the user.

12. The method of claim 9, wherein determining the popularity index further includes identifying temporal factors.

13. The method of claim 12, wherein temporal factors include a time of day and a time of year.

14. A computer-implemented method in a computerized environment for ranking landmarks within a geographical area, the method comprising:
    identifying a geographical area, wherein the geographical area is a city;
    identifying a plurality of landmarks located within the geographical area;
    determining, utilizing a first computer process, a first popularity index for a first landmark within the geographical area, wherein determining the first popularity index includes:
        (i) identifying a first quantity of access routes that grant access to the first landmark, wherein the first quantity of access routes represents a numerical value of access routes that grant access to the first landmark;
        (ii) identifying a first quantity of additional landmarks within a defined distance from the first landmark; and
        (iii) identifying a first common name factor, wherein the first common name factor includes other landmarks that share at least a part of a name with the first landmark;
    applying a separate weight value to each of the first quantity of access routes, the first quantity of additional landmarks within a defined distance from the first landmark, and the first common name factor, wherein the weight factor is determined based on user preference;
    determining, utilizing a second computer process, a second popularity index for a second landmark within the geographical area, wherein determining the second popularity index includes:
        (i) identifying a second quantity of access routes that grant access to the second landmark, wherein the second quantity of access routes represents a numerical value of access routes that grant access to the second landmark;
        (ii) identifying a second quantity of additional landmarks within a defined distance from the second landmark; and
        (iii) identifying a second common name factor, wherein the second common name factor includes other landmarks that share at least a part of a name with the second landmark;
    applying a separate weight factor to each of the second quantity of access routes, the second quantity of additional landmarks within a defined distance from the second landmark, and the second common name factor, wherein the weight factor is determined based on user preference;
    ranking the first landmark and the second landmark based upon the first popularity index and the second popularity index; and displaying a list of landmarks including the first landmark and the second landmark, wherein the list of landmarks is organized such that a landmark with a highest popularity index is displayed first on the list, wherein the first and second computer processes are executed utilizing one or more computing devices.

15. The method of claim 14, wherein ranking landmarks includes performing a summation of each of the first popularity index factors to determine the first popularity index and performing a summation of each of the second popularity index factors to determine the second popularity index.

16. The method of claim 14, wherein the geographical area is defined by a radius, wherein the radius is based at least in part on a user defined preference.

* * * * *